United States Patent
Berger et al.

(10) Patent No.: US 8,145,410 B2
(45) Date of Patent: Mar. 27, 2012

(54) VARIABLE DISPLACEMENT ENGINE OPERATION WITH NVH MANAGEMENT

(75) Inventors: Al Henry Berger, Brownstown, MI (US); Vince Paul Solferino, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1041 days.

(21) Appl. No.: 12/043,181

(22) Filed: Mar. 6, 2008

(65) Prior Publication Data

US 2008/0154468 A1  Jun. 26, 2008

Related U.S. Application Data

(63) Continuation-in-part of application No. 10/907,721, filed on Apr. 13, 2005, now abandoned.

(51) Int. Cl.
*G06F 17/00* (2006.01)
*G01M 15/00* (2006.01)
*F16H 59/74* (2006.01)

(52) U.S. Cl. ........................ 701/111; 701/51

(58) Field of Classification Search .......... 701/111, 701/51, 54, 64, 115; 477/102, 101, 109; 73/118.02, 116.05, 862.16
See application file for complete search history.

(56) References Cited

U.S. PATENT DOCUMENTS

| | | | |
|---|---|---|---|
| 3,365,973 A | 1/1968 | Henden | |
| 4,163,399 A | 8/1979 | Yamada et al. | |
| 4,617,885 A | 10/1986 | Oshiro et al. | |
| 4,648,359 A | 3/1987 | Ito | |
| 4,807,467 A * | 2/1989 | Kugler | 73/118.02 |
| 4,920,825 A | 5/1990 | Okazaki et al. | |
| 4,923,027 A | 5/1990 | Hayashi et al. | |
| 4,977,508 A | 12/1990 | Tanaka et al. | |
| 5,033,425 A | 7/1991 | Kadomukai et al. | |
| 5,282,444 A | 2/1994 | Ito et al. | |
| 5,375,571 A | 12/1994 | Diehl et al. | |
| 5,469,820 A | 11/1995 | Data et al. | |
| 5,551,928 A | 9/1996 | Sudau | |
| 5,570,615 A | 11/1996 | Westphal et al. | |
| 5,657,728 A | 8/1997 | Diggs | |

(Continued)

FOREIGN PATENT DOCUMENTS

EP       0 599 125 B1    3/1997

(Continued)

OTHER PUBLICATIONS

T.G. Leone, M. Pozar, Fuel Economy Benefit of Cylinder Deactivation—Sensitivity to Vehicle Application and Operating Constraints, SAE 2001-01-3591, Sep. 24-27, 2001.

*Primary Examiner* — Hieu T Vo
(74) *Attorney, Agent, or Firm* — Allan J. Lippa; Brooks Kushman P.C.

(57) ABSTRACT

A system and method for controlling an internal combustion engine operable with a first cylinder firing frequency and a second cylinder firing frequency to reduce or eliminate transmission of torsional vibrations associated with the second cylinder firing frequency to reduce or eliminate constraints on reduced displacement mode operation using a closely coupled drive train component rotating in an opposite direction relative to rotating components of the engine. A close coupling device allows the inertia of the counter-rotating elements to reduce or eliminate the torque reaction of the drivetrain associated with acceleration and deceleration of the engine crankshaft in response to the second cylinder firing frequency in the reduced displacement mode.

20 Claims, 7 Drawing Sheets

U.S. PATENT DOCUMENTS

| | | |
|---|---|---|
| 5,791,309 A | 8/1998 | Yamazaki et al. |
| 6,263,853 B1 | 7/2001 | Rau |
| 6,373,205 B1 | 4/2002 | Weimer et al. |
| 6,377,882 B1 * | 4/2002 | Ito .................................... 701/54 |
| 6,382,163 B1 | 5/2002 | Murray et al. |
| 6,442,455 B1 | 8/2002 | Kotre et al. |
| 6,516,770 B1 | 2/2003 | Berger et al. |
| 6,655,340 B2 | 12/2003 | Garza |
| 6,715,376 B2 | 4/2004 | Hojyo et al. |
| 6,732,694 B2 | 5/2004 | Holweg |
| 6,799,553 B1 | 10/2004 | Takenaka et al. |
| 6,868,815 B2 | 3/2005 | Carden |
| 7,013,859 B2 | 3/2006 | Linnig |
| 7,086,301 B2 * | 8/2006 | Sakamoto et al. ............ 477/101 |
| 2004/0244761 A1 | 12/2004 | Takeuchi |

FOREIGN PATENT DOCUMENTS

| | | |
|---|---|---|
| EP | 0599125 B1 | 3/1997 |
| EP | 0 499 125 B1 | 4/1998 |
| EP | 0499125 B1 | 4/1998 |
| JP | 07-035198 | 2/1995 |
| JP | 7-35198 | 2/1995 |
| JP | 2002-357246 | 12/2002 |
| WO | 03/004845 A1 | 1/2003 |
| WO | 03004845 A1 | 1/2003 |

* cited by examiner

FIG. 1

| NUMBER OF FIRING CYLINDERS | CYLINDER FIRING SEQUENCE | | | | | | TORQUE AT WOT (Nm) |
|---|---|---|---|---|---|---|---|
| | 1 | 2 | 3 | 4 | 5 | 6 | |
| 1 | FIRE | - | - | - | - | - | 55 |
| 2 | FIRE | - | - | FIRE | - | - | 110 |
| 3 | FIRE | - | FIRE | - | FIRE | - | 165 |
| 4 | FIRE | FIRE | - | FIRE | FIRE | - | 219 |
| 5 | FIRE | FIRE | FIRE | FIRE | FIRE | - | 274 |
| 6 | FIRE | FIRE | FIRE | FIRE | FIRE | FIRE | 329 |

VARIABLE DISPLACEMENT ENGINE OPERATION WITH NVH MANAGEMENT

CROSS-REFERENCE TO RELATED APPLICATION

This application is a continuation-in-part of, and claims priority to commonly owned U.S. patent application Ser. No. 10/907,721 filed on Apr. 13, 2005, now abandoned, the disclosure of which is hereby incorporated by reference in its entirety.

BACKGROUND

1. Technical Field

The present disclosure relates to systems and methods for controlling an internal combustion engine to operate in a reduced or variable displacement mode while managing noise, vibration, and harshness (NVH).

2. Background Art

Internal combustion engines are generally most fuel efficient when operating unthrottled at a compression ratio that allows the ignition timing to produce best torque without detonation. To meet customer expectations for acceleration and responsiveness, engines are often sized such that the maximum power exceeds the vehicle's power requirements under most operating conditions. As such, it is necessary to limit the engine's power production to deliver the power expected by the driver. For spark ignition engines, this reduction of engine power is usually done by controlling position of an airflow limiting device, such as a throttle valve, to limit airflow to the combustion chambers. While airflow control is an effective way to control power output, it generally results in reduced fuel efficiency associated with increased pumping losses to move air into the cylinders, combustion heat losses, and reduced cylinder pressures.

A variable displacement engine (VDE) improves fuel efficiency by selectively operating in a reduced displacement mode where one or more cylinders are deactivated to reduce pumping losses and combustion heat losses while increasing the cylinder pressure for the operating cylinders. For optimal fuel efficiency, the minimum number of cylinders operating at maximum power output would be utilized to deliver the requested power or torque. However, operation in one or more reduced displacement modes alters the frequency and magnitude of the torque pulsations or disturbances generated by the cylinder firings, which may be transmitted through the chassis and result in undesirable noise and vibration within the vehicle cabin. In general, cylinder deactivation causes lower frequency and higher amplitude torque pulsations at the crankshaft. As such, operation in the reduced displacement mode is typically limited or constrained to mid-range engine speeds at low or moderate loads. Unfortunately, the constraints that have the most negative impact on the potential fuel economy benefit are associated with unacceptable NVH, including operating at low RPM, idle, and engine lugging, for example. In one study, a fuel efficiency improvement of up to 14% was obtainable using reduced displacement operation without such constraints. Limiting reduced displacement mode operation by imposing an engine lugging limit of 1400 rpm reduced the benefit by 2.1%. Other NVH constraints also adversely impacted the available fuel economy benefit by preventing reduced displacement operation at idle (−2.1%), near idle (such as below 1000 rpm) (−1.4%), in first and second gear (−2.0%), and during engine warm-up (−0.9%). When all constraints (NVH and other) were imposed, the available fuel economy improvement of about 14% was reduced to only about 6%. As such, reducing or eliminating NVH originating from the change in engine firing frequency and magnitude associated with reduced displacement operating modes facilitates increased operating time in these modes and may result in improved overall fuel efficiency for the engine/vehicle.

Prior art approaches to managing NVH in variable displacement engines include limiting variable displacement operation, which negatively impacts the potential fuel economy benefit as previously described, tuning the powertrain mounts or using actively controlled mounts to minimize transmission of vibrations, and active noise cancellation within the vehicle cabin. Other known solutions consist of the addition of one or more counter-rotating elements to reduce or eliminate inertial torque reaction, such as disclosed in U.S. Pat. No. 5,570,615, for example. U.S. Pat. No. 4,163,399 to Yamada discloses a motorcycle power plant having three parallel shafts with the torque converter gear-driven from the crankshaft so the crankshaft and torque converter rotate in opposite directions to provide compactness. Neither the NVH issues associated with operating in a reduced displacement mode nor the NVH issues associated with gear rattle caused by cyclical loads are addressed. Also, there was no expressed intent to match the effective magnitudes of the forward and backward rotating inertias. U.S. Pat. No. 5,282,444 to Ito discloses a powerplant for a personal watercraft that uses a counter-rotating member to improve vehicle stability, but does not address NVH issues, does not eliminate backlash in the gear set, and does not operate in a reduced displacement mode. The watercraft powerplant uses a counter-rotating member that rotates slower than the crankshaft to reduce any yaw moment that would be produced by the gyroscopic effect in response to pitching of the watercraft.

While acceptable for some applications, none of the prior art approaches passively manages NVH associated with the engine firing frequency to expand available operating conditions for a reduced displacement mode using existing powertrain components.

SUMMARY

The present disclosure includes a system and method for controlling an internal combustion engine in one or more reduced displacement modes by managing NVH associated with inertial torque reaction in response to varying cylinder firing frequency and peak torque disturbances by rotating closely coupled inertial powertrain or drivetrain components in a direction opposite to the rotation of engine/motor inertial components, to reduce or eliminate torque reaction on stationary powertrain components.

In one embodiment, the present disclosure includes controlling a multi-cylinder internal combustion engine to operate in at least one reduced displacement mode by deactivating at least one cylinder and having a close-coupling device with no backlash and minimal elasticity that reverses rotation of one or more transmission or transaxle components relative to the crankshaft and other rotating engine/motor components to reduce or eliminate noise, vibration, and harshness otherwise associated with the angular acceleration/deceleration associated with the cylinder firings of the operating cylinders. The device may operate in cooperation with various drive components such as gears, belts, chains and sprockets, or any similar device used to closely couple an output component of an internal combustion engine to one or more components of the powertrain. The device causes one or more powertrain inertial components to rotate in a direction opposite to that of various engine inertial components, such as a crankshaft, and closely couples the engine/motor and drivetrain so the counter-rotating inertia reduces or eliminates the noise and vibration associated with the cylinder firings of the active cylinders that would otherwise be transmitted through the chassis. The effective inertia of the backward rotating components may be substantially matched to that of the forward rotating components using a device with an appropriate input/output ratio to create a speed differential between the backward rotating engine/motor components and the forward rotating powertrain components, or by adjusting the mass or component geometry of engine or powertrain components, for example.

In a transversely mounted internal combustion engine and transaxle, as generally used in, but not limited to, front wheel drive (FWD) vehicles, for example, the crankshaft and the torque converter may be connected using toothed wheels with a biasing element interposed therebetween to provide a stiff, non-compliant coupling without excessive lash enabling the torque converter and crankshaft to rotate in opposite directions. The biasing element may be a separate or integrated device that accommodates low-frequency component changes, such as thermal expansion or wear, while being essentially stiff or rigid to higher frequency accelerations/decelerations associated with oscillation of the crankshaft in response to cylinder firings during the reduced displacement mode. In one embodiment, the biasing element is implemented by a scissors gear with a spring preload selected to provide the desired negative torque carrying cpacity. The opposing direction of rotation of the crankshaft and torque converter reduces or eliminates the inertial torque reaction on the stationary powertrain structure to reduce or eliminate unwanted vibration and noise. This facilitates operation in reduced displacement mode at idle and low engine speeds and engine lugging, for example.

A longitudinally mounted engine and transmission application, as generally used in, but not limited to, rear wheel drive (RWD) vehicles, for example, may incorporate a simple planetary gear set to connect the crankshaft to the torque converter. Such a planetary gear set typically includes a sun gear, a ring gear, and a carrier with a plurality of pinions that are constantly in mesh with the sun and ring gears. In such an arrangement, for example, the carrier may be rendered stationary by using a plurality of fasteners to connect it with the engine/motor block. The sun gear of the planetary gear set may be connected to the crankshaft using any of a variety of methods including using conventional fasteners or alternatively splines with at least one retaining ring. Likewise, the ring gear or the annulus of the planetary gear set may be connected to the engine/motor flex plate using a plurality of fasteners. Such an arrangement allows the ring gear to rotate in a direction opposite to that of the sun gear when the carrier is non-rotating. Thus, at least one drivetrain component, such as the torque converter, will rotate in a direction opposite to that of the crankshaft and create corresponding rotational inertia to reduce or eliminate the inertial torque reaction otherwise associated with angular acceleration/deceleration of rotating components of the engine during a reduced displacement operating mode.

The present disclosure provides a number of advantages. For example, the present disclosure expands the acceptable operating range of a reduced displacement mode by effectively managing NVH otherwise associated with uneven firing intervals or operation at low speed, idle, and or lugging conditions to improve overall fuel efficiency. By reducing or eliminating NVH issues associated with reduced displacement operating modes, power output may be varied by activating/deactivating individual cylinders with reduced throttling to smooth engine power output and reduce step changes in torque. For hybrid generator/motor applications driven by the engine, torque transitions can be smoothed by adding or removing torque using the generator/motor so that no throttling is required. The present disclosure reverses rotation of conventional powertrain components using a coupling device that will accommodate thermal expansion and wear while providing an otherwise stiff or non-compliant coupling to obviate the need for additional components or mass to generate balancing inertia. This reduces any adverse impact on powertrain weight, responsiveness, and overall performance relative to conventional solutions that add components solely for balancing or canceling torque reactions associated with rotating inertia.

The above advantage and other advantages and features of the present disclosure will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the present disclosure as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations. The present disclosure relates to a system and method for controlling a reduced displacement mode or modes of a multiple cylinder internal combustion engine while managing NVH associated with torsional accelerations/decelerations associated with cylinder firings so that the reduced displacement mode can be used under more diverse operating conditions without being objectionable to the vehicle occupants. The representative embodiments used to illustrate and describe the disclosure relate generally to a four-stroke, multi-cylinder port injected internal combustion engine with electromagnetic valve actuation. Of course, the present disclosure is independent of the particular engine/vehicle technology or number of cylinders and may be used in a wide variety of applications with various implementations including spark-ignition, compression-ignition, direct injected and/or port injected engines, for example.

Figure 1:
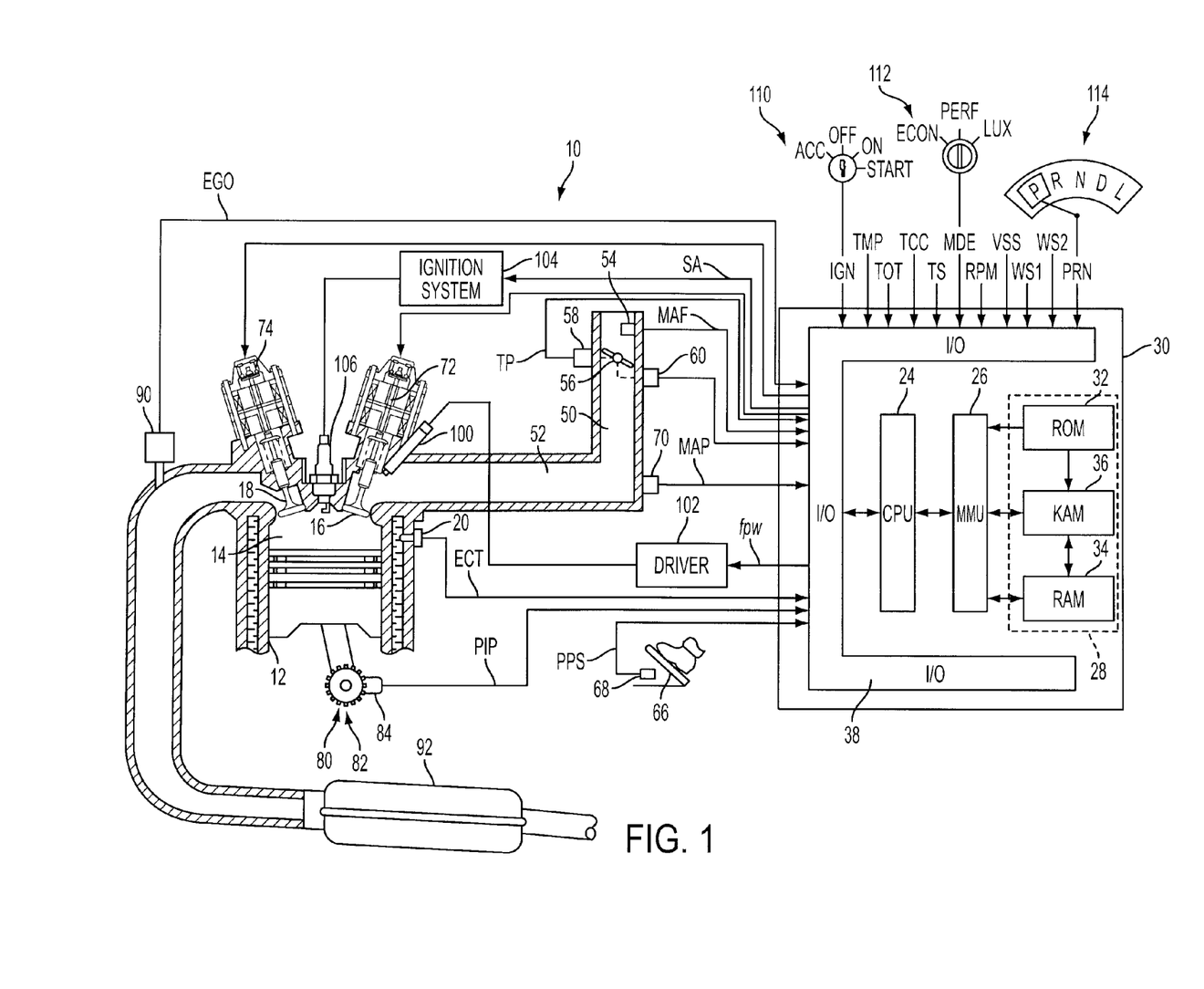
FIG. 1 is a block diagram of a system or method for operating an engine in a reduced displacement mode while managing NVH according to one embodiment of the present disclosure.

In the representative embodiment illustrated in FIG. 1, system 10 includes a vehicle (not specifically illustrated) powered by an internal combustion engine having a plurality of cylinders, represented by cylinder 12, with corresponding combustion chambers 14. As one of ordinary skill in the art will appreciate, system 10 includes various sensors and actuators to effect control of the engine/vehicle. One or more sensors or actuators may be provided for each cylinder 12, or a single sensor or actuator may be provided for the engine. For example, each cylinder 12 may include four gas exchange valves including two intake valves 16 and two exhaust valves 18, with only one of each shown in the Figure. However, the engine may include only a single engine coolant temperature sensor 20. In the embodiment illustrated in FIG. 1, the engine includes electromagnetically or electronically actuated intake valves 16 and exhaust valves 18 in communication with a microprocessor-based controller 30 to control valve opening and closing, which can be used to provide one or more reduced displacement operating modes with one or more cylinders deactivated and not combusting fuel. Other embodiments may include electronically actuated intake valves 16 and conventional exhaust valves 18 actuated by an associated camshaft (not shown). As used herein, a reduced displacement mode includes an engine operating mode where one or more cylinders do not combust fuel to power the crankshaft while deactivated. As those of ordinary skill in the art will appreciate, reduced or variable displacement operating modes encompass various strategies and technologies for deactivating one or more cylinders that may include modifying or disabling operation of the intake valves, exhaust valves, or both in combination with cutting off fuel provided to the deactivated cylinders. Intake and/or exhaust valve control may be implemented using electromagnetic valve actuators or electric/hydraulic actuators known in the art.

Controller 30 has a microprocessor 24, called a central processing unit (CPU), in communication with memory management unit (MMU) 26. MMU 26 controls the movement of data among the various computer readable storage media 28 and communicates data to and from CPU 24. Computer readable storage media 28 preferably include volatile and non-volatile storage in read-only memory (ROM) 32, random-access memory (RAM) 34, and keep-alive memory (KAM) 36, for example. KAM 36 may be used to store various operating variables while CPU 24 is powered down. Computer-readable storage media 28 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. Computer-readable storage media 28 may also include floppy disks, CD-ROMs, hard disks, and the like.

CPU 24 communicates with various engine/vehicle sensors and actuators via an input/output (IPO) interface 38. Interface 38 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of items that may be directly or indirectly actuated under control of CPU 24, through I/O interface 38, are fuel injection timing, rate, and duration, throttle valve position, spark plug ignition timing (for spark-ignition engines), intake/exhaust valve actuation, timing, and duration, front-end accessory drive (FEAD) components such as an alternator, and the like. Sensors communicating input through I/O interface 38 may be used to indicate crankshaft position (PIP), engine rotational speed (RPM), wheel speed (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, air flow (MAF), selected and/or current transmission gear or ratio (PRN), transmission oil temperature (TOT), transmission turbine speed (TS), torque converter clutch status (TCC), reduced displacement mode switch (MDE), for example.

Some controller architectures do not contain an MMU 26. If no MMU 26 is employed, CPU 24 manages data and connects directly to ROM 32, RAM 34, and KAM 36. Of course, the present disclosure could utilize more than one CPU 24 to provide engine control and controller 30 may contain multiple ROM 32, RAM 34, and KAM 36 coupled to MMU 26 or CPU 30 depending upon the particular application.

In operation, air passes through intake 50 and is distributed to activated cylinders via an intake manifold, indicated generally by reference numeral 52. System 10 preferably includes a mass airflow sensor 54 that provides a corresponding signal (MAF) to controller 30 indicative of the mass airflow. A throttle valve 56 may be used to modulate the airflow and control pressure in intake 50 to control engine torque and resulting vehicle acceleration as described herein. Throttle valve 56 is preferably electronically controlled by an appropriate actuator 58 based on a corresponding throttle position (TP) signal generated by controller 30 and the current engine operating mode. The throttle position (TP) signal may be generated in response to a corresponding engine output or torque requested by an operator via accelerator pedal 66. A throttle position sensor 60 provides a feedback signal to controller 30 indicative of the actual position of throttle valve 56 to implement closed loop control of throttle valve 56. As previously described, operation in a reduced or variable displacement mode more closely matches desired output torque to the number of cylinders required to produce that output torque when operating at a wide open throttle position to reduce pumping losses and conserve combustion heat in activated cylinders. NVH management with a closely couple counter-rotating inertial component according to embodiments of the present disclosure facilitates operating in a reduced displacement mode under various engine/vehicle operating conditions, such as low engine speed, idle, engine lugging, etc. that may otherwise create objectionable NVH as described in greater detail herein.

A manifold absolute pressure sensor 70 is used to provide a signal (MAP) indicative of the manifold pressure to controller 30. Air passing through intake manifold 52 enters combustion chamber 14 through appropriate control of one or more intake valves 16. Intake valves 16 and/or exhaust valves 18 may be controlled using electromagnetic actuators 72, 74, a conventional camshaft arrangement, a variable camshaft timing arrangement, or a combination thereof depending on the particular application and implementation. In one embodiment, intake valves 72 are constant lift valves that are electromagnetically operated by controller 30 to control intake valve timing including opening, closing, and duration with exhaust valves 18 being operated by a conventional cam or variable cam device. Intake and/or exhaust valve timing and duration may be controlled in combination with throttle valve position to operate in a reduced or variable displacement operating mode or modes to provide a desired engine torque. In one embodiment, mode switch 112 may be used to select a preferred reduced displacement operating strategy with the actual number of deactivated cylinders determined based on the requested engine torque. Other embodiments may not include a driver-selectable mode switch with reduced displacement operating mode(s) determined only by controller 30. One or more reduced displacement modes may be provided with or without a selection switch 112. For example, a first mode may operate with half of the available cylinders firing with a second mode adding or subtracting one or more cylinders.

Rotational position information for controlling the engine may be provided by a crankshaft position sensor 80 that includes a toothed wheel 82 and an associated sensor 84. Crankshaft position sensor 80 may be used to generate a signal (PIP) used by controller 30 for fuel injection and ignition timing. Crankshaft position sensor 80 may also be used to determine engine rotational speed and to identify cylinder combustion based on an absolute, relative, or differential engine rotation speed.

An exhaust gas oxygen sensor 90 provides a signal (EGO) to controller 30 indicative of whether the exhaust gasses are lean or rich of stoichiometry. Depending upon the particular application, sensor 90 may provide a two-state signal corresponding to a rich or lean condition, or alternatively a signal that is proportional to the stoichiometry of the exhaust gases. This signal may be used to adjust the air/fuel ratio, or control the operating mode of one or more cylinders, for example. The exhaust gas is passed through the exhaust manifold and one or more catalysts 92 before being exhausted to atmosphere.

A fuel injector 100 injects an appropriate quantity of fuel in one or more injection events for the current operating mode based on a signal (FPW) generated by controller 30 and processed by driver 102. At the appropriate time during the combustion cycle, controller 30 generates a spark signal (SA) that is processed by ignition system 104 to control spark plug 106 and initiate combustion within chamber 14. Spark signals may be generated for deactivated cylinders during reduced or variable displacement mode to maintain a desired operating temperature.

As also illustrated in FIG. 1, controller 30 may receive inputs from various vehicle switches, selectors, or other devices such as an ignition switch 110, mode switch 112 and gear or ratio selector 114. As previously described, an optional mode selector switch 112 may be used to select a preferred reduced displacement strategy with the reduced displacement mode determined by the switch input in combination with current engine, vehicle, and/or ambient operating conditions. For example, mode switch 112 may be used to indicate an economy (ECON) mode when reduced displacement operation is used whenever operating conditions permit, performance (PERF) mode when reduced displacement operation is not used or used only at light load, and luxury (LUX) mode where reduced displacement operation is used only when imperceptible to vehicle occupants. Alternatively, or in combination, the mode selector switch may determine the maximum number of cylinders that are deactivated when conditions permit, with economy mode deactivating more than performance or luxury mode, for example.

Controller 30 includes software and/or hardware implementing control logic to control the engine to operate in one or more reduced displacement modes based on current engine, vehicle, and/or ambient operating conditions. Current operating conditions, such as engine rotational speed or transmission gear may be determined using corresponding sensors, such as wheel speed sensors (WS1, WS2), vehicle speed sensor (VSS), transmission turbine speed sensor (TS), etc. As previously described, current transmission gear or gear ratio may be used in determining whether to operate in a reduced displacement mode depending upon the particular vehicle and implementation. Drivability constraints imposed on various prior art variable displacement applications may be narrowed or eliminated using the closely coupled counter rotating components to reduce or eliminate NVH issues according to various embodiments of the present disclosure.

Figure 2:
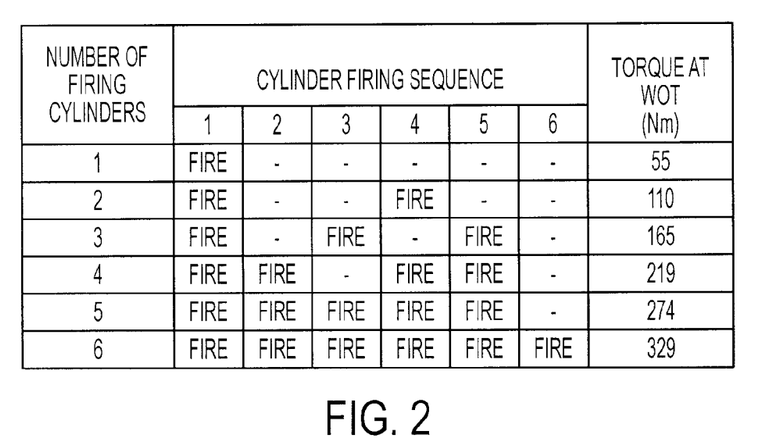
FIG. 2 is a chart illustrating representative firing sequences for a six-cylinder engine operable in one or more reduced displacement operating modes according to embodiments of the present disclosure.

FIG. 2 is a table illustrating a representative cylinder firing sequence for a 6-cylinder internal combustion engine operable in one or more reduced displacement operating modes according to one embodiment of the present disclosure. While FIG. 2 illustrates all possible modes, the actual number of reduced displacement modes available may vary depending upon the requirements of each particular application. For optimal efficiency, the minimum number of cylinders required to produce the requested torque for the current operating conditions would be activated and firing. Using the closely coupled counter-rotating components according to embodiments of the present disclosure may eliminate NVH issues providing increased authority for the engine controller to more closely match the torque requirements to the number of activated cylinders such that each activated cylinder operates closer to, or at WOT to reduce pumping losses. For example, the engine controller may use two or three active cylinders for low load operation and subsequently activate a single cylinder at a time for a steadily increasing torque demand, such as when ascending a hill. Alternatively, multiple cylinders or a group of cylinders may be activated to meet anticipated or predicted torque demand. Of course, the engine controller may activate more than the minimum required number of cylinders based on current engine, vehicle, and ambient operating conditions, or to provide a desired drivability or performance characteristic.

As those of ordinary skill in the art will appreciate, the representative cylinder firing sequence and torque values at wide open throttle (WOT) illustrated in FIG. 2 correspond to a typical six-cylinder engine with even firing intervals. The actual number of cylinders, the assigned cylinder identification numbers, and the firing sequence may vary depending upon the particular application and implementation. In general, the numbers shown for the cylinder firing sequence do not correspond to actual cylinder numbers, but instead refer to the order in which the cylinders fire. The firing sequence illustrated attempts to minimize the magnitude of crankshaft torsional disturbances by keeping the firing intervals as evenly spaced as possible. As shown in the table of FIG. 2, the first cylinder would fire in all configurations while the sixth cylinder would fire only when all cylinders are active. As such, it would be desirable to provide a rolling assignment of firing sequence to equalize operating temperatures and wear among all of the cylinders. Similarly, depending upon the particular engine configuration, some reduced displacement operating modes may deactivate all cylinders associated with a particular cylinder bank. To maintain desired operating temperatures for those cylinders and related downstream emissions control devices, the activated/deactivated cylinders may be alternated.

When the engine is cold started, it is desirable to heat the exhaust catalytic converter quickly to minimize hydrocarbon and carbon monoxide emissions. It may be desirable under some cold start conditions to minimize exhaust gas heat loss by firing only those cylinders that are closest to the catalytic converter until the catalytic converter has reached its desired operating temperature.

Figures 3A, 3B:
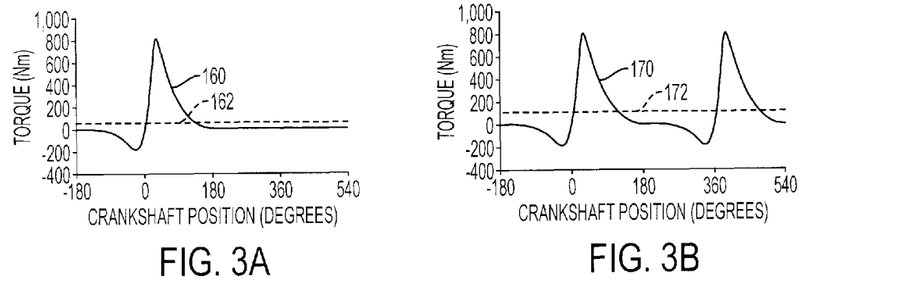
FIGS. 3A-3F illustrate torque signatures for one engine cycle of representative reduced displacement modes according to embodiments of the present disclosure.
Figure 3C:
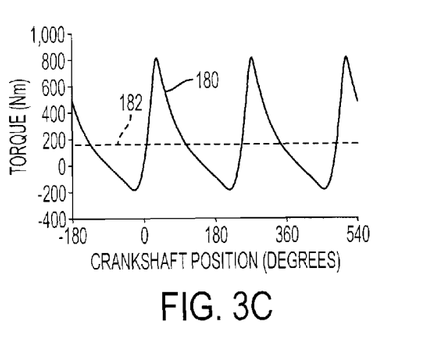
Figure 3D:
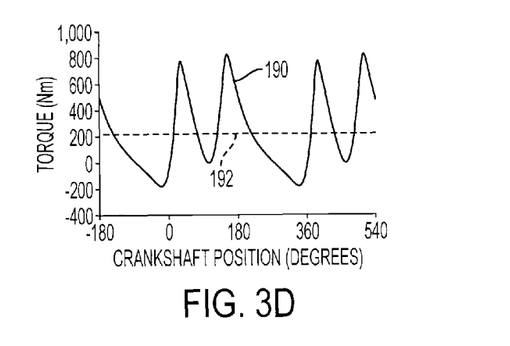
Figure 3E:
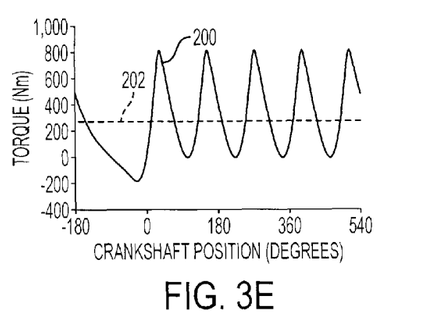
Figure 3F:
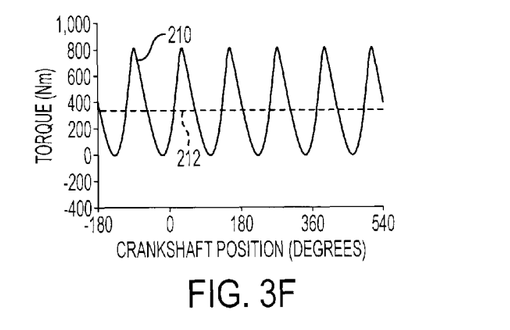

FIGS. 3A-3F illustrate instantaneous and average torque pulsations generated by combustion in activated cylinder(s) for one cycle of various reduced displacement operating modes for a representative six-cylinder internal combustion engine operating at 1500 rpm and WOT. FIG. 3A illustrates the instantaneous torque 160 created with a single cylinder firing, which would produce an average torque 162 of about 55 Nm as illustrated in the chart of FIG. 2. Similarly, FIG. 3B illustrates the instantaneous torque 170 and average torque 172 produced associated with a reduced displacement mode having two active cylinders and four deactivated or non-firing cylinders. FIG. 3C illustrates an instantaneous torque 180 and average torque 182 produced for a reduced displacement mode with one-half of the available cylinders deactivated and one-half of the available cylinders firing. FIG. 3D illustrates instantaneous torque 190 and average torque 192 associated with four cylinder firings per engine cycle. Similarly, FIGS. 3E and 3F illustrate instantaneous torque 200, 210 and average torque 202, 212 associated with five and six cylinders firing, respectively.

Figure 4:
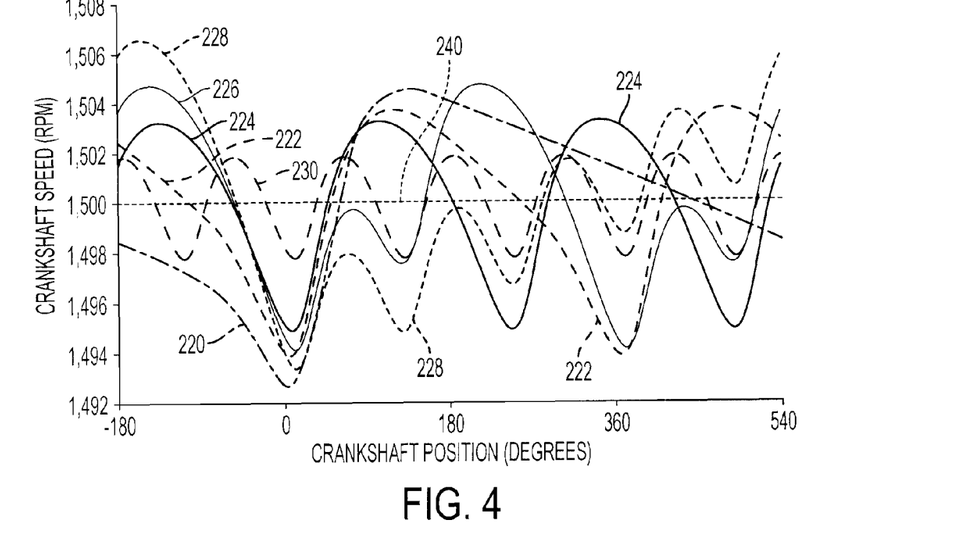
FIG. 4 is a graph illustrating variation in crankshaft speed for representative reduced displacement modes according to embodiments of the present disclosure.

FIG. 4 is a graph illustrating instantaneous and average crankshaft rotational speed as a function of crankshaft rotational position associated with the torque produced by activated cylinder firings as illustrated in FIGS. 3A-3F during operation in various reduced displacement modes. Line 220 corresponds to a one-cylinder firing per engine cycle of 720 crankshaft degrees (corresponding to two crankshaft revolutions per cycle for a four-stroke engine) for a representative reduced displacement mode having crankshaft speed variation of between about 1493 to 1505 rpm. With two cylinder firings per cycle, crankshaft speed variation extends from about 1494 to 1504 rpm as represented by line 222. Line 224 corresponds to three cylinder firings per cycle with somewhat less rpm variation of between 1495 and 1503 rpm. Four cylinder firings provide rpm variation of between about 1494 and 1505 rpm as illustrated by line 226. Line 228 illustrates the largest rpm variation, which is associated with five cylinder firings and has values between about 1493 and 1507 rpm. Line 230 represents the smallest rpm variation of between about 1498 and 1502 associated with all six cylinders firing. Line 240 represents the average crankshaft speed of 1500 rpm.

Figure 5:
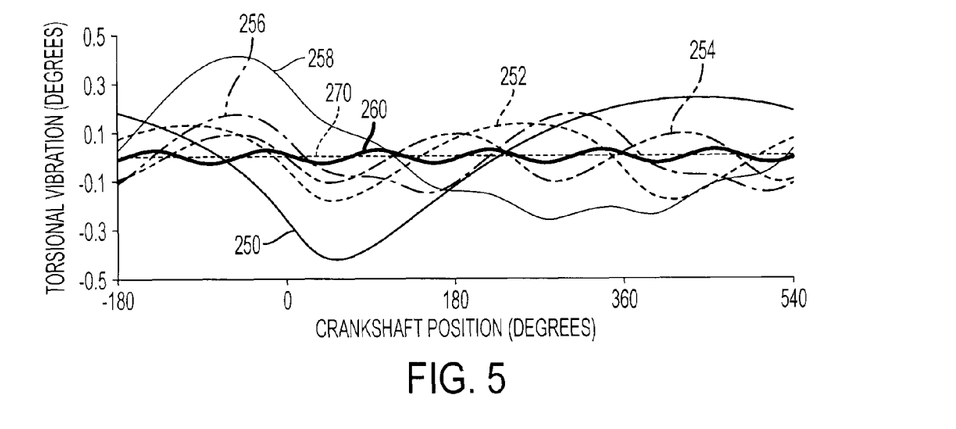
FIG. 5 is a graph illustrating torsional vibration angular amplitudes associated with cylinder firing frequency for representative reduced displacement modes according to the present disclosure.

FIG. 5 is a graph illustrating torsional vibration as a function of crankshaft rotational position associated with cylinder firing frequencies during operation in various reduced displacement modes. In general, there are two sources of torsional excitation for the stationary powertrain structure that is held in place by the engine or motor mounts: external torque from the powertrain output shaft; and reaction torque from accelerations imposed upon the powertrain rotating inertias with both sources excited by the cylinder firing frequency.

Externally created vibrational torque transmitted to the powertrain through the output shaft is usually small because it is customary practice to isolate the output shaft from crankshaft vibrations through a torque converter and/or an elastic torsional isolator or damper. The magnitude of crankshaft torsional vibrations is proportional to the total rotating inertia that is tightly or closely coupled to the crankshaft, so the addition of counter-rotating inertia according to the present disclosure is beneficial in reducing the magnitude of any externally created torque. In series hybrid powertrain applications, no mechanical power output shaft is provided so no externally created torsional vibrations are present.

Internally created inertial acceleration torques are characterized by Newton's third law of motion (for every action, there is an equal and opposite reaction). Viewing the powertrain as a free body composed of a rotating inertia and a "stationary" inertia, the rotating inertia is primarily provided by the crankshaft, flywheel, torque converter (where present) connecting rods, and front crankshaft damper/FEAD (front end accessory drive) pulley. A relatively stationary inertia is provided by the cylinder block and all components rigidly attached thereto. When a cylinder's firing pulse causes a positive angular acceleration of the rotating inertia, there is an equal but opposite torque applied to the stationary inertia that causes it to accelerate in the negative rotational direction. Likewise, when the rotating inertia is decelerated on a cylinder compression stroke, a positive acceleration is imposed on the stationary inertia components. According to the present disclosure, the forward rotating inertial components are tightly or closely coupled to an appropriate amount of backward rotating inertia so that the accelerations of the backward rotating inertia cause a torsional reaction on the cylinder block that completely cancels that of the forward rotating inertia. As such, the cylinder block and other stationary inertial components do not vibrate in reaction to the cylinder firing pulses. The backward rotating inertia must be closely or tightly coupled to the forward rotating inertia to have an appropriate magnitude and phase to cancel the torque reaction. Otherwise, the torsional reaction generated by the backward rotating inertial inertia could shift out of proper phase relationship and actually increase the magnitude of the cylinder block torque reaction rather than reducing or cancelling the reaction as intended.

The torsional vibrations illustrated in FIG. 5 by the angular displacement of crankshaft rotational position represent the reaction to torque imposed upon the powertrain rotating inertias and in the absence of vibrational resonance are proportional to the angular displacement, in the opposite direction, of the stationary powertrain structure. The angular displacement of the crankshaft is proportional to the magnitude of vibration that excites the engine mounts and may be transmitted to the vehicle cabin if not attenuated using closely coupled counter-rotating inertial components according to embodiments of the present disclosure.

Line 250 of FIG. 5 illustrates torsional vibration associated with a single cylinder firing per cycle. Lines 252, 254, 256, 258, and 260 represent torsional vibrations associated with two, three, four, five, and six cylinder firings per cycle, respectively. As illustrated, torsional vibrations generally increase in amplitude and decrease in frequency when operating in a reduced displacement mode. As described in greater detail herein, the present disclosure uses closely coupled counter-rotating inertial components to match the reaction torques of the forward and backward rotating inertial components to reduce or eliminate torsional vibrations associated with the firing frequency of cylinders when operating in a reduced displacement mode, resulting in near zero torsional vibration of the stationary powertrain structure.

Figure 6:
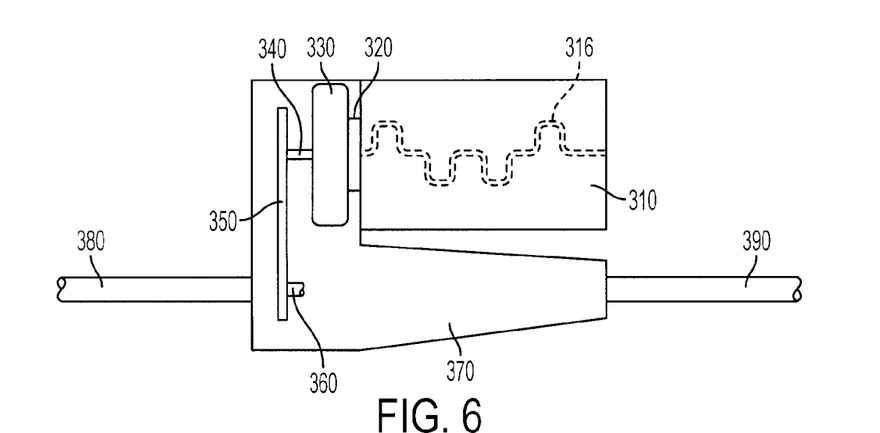
FIG. 6 is a top view block diagram illustrating a system or method for managing inertial torque reaction of a transversely mounted powertrain according to one embodiment of the present disclosure.

Referring now to FIG. 6, a block diagram illustrating a representative embodiment of the present disclosure in a transversely mounted powertrain application is shown. As those of ordinary skill in the art will appreciate, transversely mounted powertrains are typically used in front wheel drive (FWD) vehicles. However, as described herein, the present disclosure is not limited to conventional vehicular applications and may be used in various types of powertrains having an internal combustion engine, or other torsional vibration inducing prime mover coupled to a drivetrain that may include a fixed or selectable gearbox, transmission, and/or transaxle to power a machine or vehicle. The present disclosure is independent of the particular transmission technology and may be used with manual or automatic gear-change or speed-change transmissions, continuously variable transmissions (CVT's), and/or any combination or hybrid. The representative transversely mounted powertrain illustrated in FIG. 6 includes a multi-cylinder internal combustion engine 310 having a plurality of inertial components that rotate during operation and resist rotational acceleration with a corresponding torque or moment that acts on stationary structure of an associated vehicle (not shown). Engine 310 generally represents any of a variety of internal combustion engines/motors that may include spark-ignition and compression-ignition engines and other prime movers particularly suited for vehicular applications. As previously described, the present disclosure may be utilized in various other types of engines and other prime movers that generate a vibrational reaction torque or moment associated with rotational acceleration or deceleration of various engine, motor, and/or transmission/powertrain components and is not limited to vehicular applications or internal combustion engines. Engine 310 typically includes one or more rotating components that may be considered the primary contributors to reaction torque transmitted through engine mounts to a vehicle chassis or other stationary structure due to the magnitude of rotational inertia of the components. For a typical internal combustion engine application, crankshaft 316 is a primary constituent of engine rotational inertia and the resulting reaction torque. Other components (not shown) whose angular acceleration may contribute to the reaction torque include a flywheel, connecting rods, harmonic damper, and camshaft(s), for example.

A device 320 closely or tightly couples crankshaft 316 of engine 10 to a rotating component of a transaxle or transmission 370, such as a torque converter 330 or flywheel, for example. As illustrated and described in greater detail below, device 320 may be implemented by one or more gears, sprockets, gear sets, belts, or other cooperating components to reverse the direction of rotation of torque converter 330 relative to crankshaft 316. The actual implementation and positioning of device 320 may depend on various application specific considerations. For example, in transversely mounted powertrain applications, the implementation of device 320 may be dictated by packaging constraints such that the particular implementation does not significantly increase the transverse length of the engine/drivetrain. In various embodiments, device 320 may also increase or decrease rotational speed of torque converter 330 relative to crankshaft 316 to generally match the effective magnitude of rotational inertia produced by rotating components of transmission/transaxle 370 to that of engine 310. Depending upon the particular application and implementation, the speed differential may be fixed, continuously variable, or selectable from two or more predetermined ratios. For example, the device may be implemented by a gear-change transmission, speed-change transmission, or continuously variable transmission. Applications using a selectable or controllable speed differential may include either a mechanical, electrical, or microprocessor based controller to determine an appropriate speed differential for current operating conditions or a selected operating mode, for example.

As also illustrated in FIG. 6, torque converter 330 is connected to turbine shaft 340, which is coupled via chain drive 350 to input shaft 360 of transmission or transaxle 370. Left axle 380 and right axle 390 are connected to corresponding left and right vehicle wheels (not shown), or various auxiliary equipment for non-vehicular applications.

In operation, torque from engine 310 is carried by crankshaft 316 through close coupling device 320 to torque converter 330, which provides a selective fluid coupling and torque multiplication under various operating conditions to turbine shaft 340. Chain drive 350 transfers torque from turbine shaft 340 and torque converter 330 through input shaft 360 to transaxle 370. Left axle 380 and right axle 390 receive power from transmission 370. Changes in rotational speed of various rotating components of engine 310, such as crankshaft 316, for example, result in a corresponding acceleration of rotational inertia and accompanying torque or moment. However, according to the present disclosure, the counter-rotation of various closely coupled transmission/transaxle or drive train components, such as torque converter 330, for example, results in a corresponding rotational acceleration of opposite hand or in the opposite direction which produces a torque or moment of opposite sense or direction that tends to reduce or cancel the torque or moment generated by the engine components. As such, the net vibrational torque reaction transmitted to the engine mounts or other stationary powertrain components, such as a vehicle chassis, is reduced or eliminated. The effective magnitudes of the rotational inertias generated by components associated with engine 310 and components associated with transmission or transaxle 370 may be tuned and/or adjusted via component mass and geometry as well as the relative rotational speed, which may be selected or determined by coupling device 320 as described herein.

Figure 7:
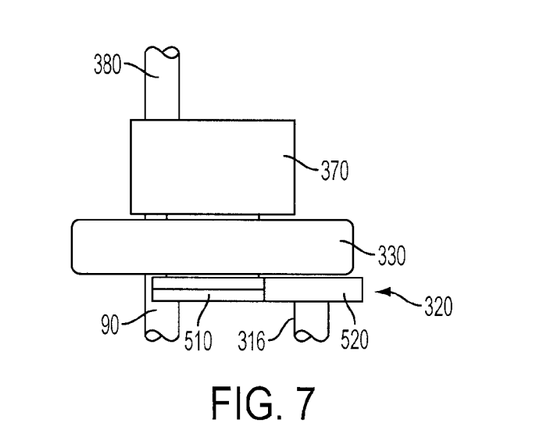
FIG. 7 is a top view block diagram illustrating another device for coupling a torque converter to an engine or motor in a system or method for managing inertial torque reaction according to the present disclosure.

A top-view block diagram illustrating a system or method for managing inertial torque reaction according to one embodiment of the present disclosure is shown in FIG. 7. In this embodiment, coupling device 320 is implemented by a spur gear or other toothed wheel 520 connected to an engine crankshaft 316 and in meshing engagement with one or more associated gears 510 with a device to provide tight or close coupling. In one embodiment, the coupling device includes a scissors gear with sufficient torque capacity, both positive and negative, to cancel the reaction torque at the cylinder firing frequency when operating in one or more reduced displacement modes while accommodating manufacturing tolerances, thermal expansion, and wear. Characteristics of a suitable close coupling device are illustrated and described in greater detail with respect to FIGS. 7, 8, and 10.

As best illustrated and described with reference to FIG. 7, coupling device 320 reverses rotational direction of torque converter 330 relative to the engine crankshaft. Depending upon the particular application and implementation, another device or a gear set may be used in place of scissors gear 510 to provide counter-rotation of one or more transmission or drive train components while closely coupling the forward rotating and backward rotating components to reduce or eliminate the stationary powertrain structure's torque reaction at the cylinder firing frequency.

As shown in FIG. 7, scissors gear 510 is connected to torque converter 330, which, in turn, is fluidly coupled via operation of torque converter 330 to the turbine shaft or input shaft of transmission 370. The relative speed between the engine crankshaft and torque converter 330 may optionally be controlled or determined by the selected input/output ratio or gear ratio of coupling device 320. In one embodiment, the gear ratio of device 320 is selected so that torque converter 330 rotates at a speed based on rotational speed of the engine crankshaft to substantially match the effective magnitudes of rotational inertia of the forward rotating transmission components to the rearward rotating engine components. Substantially matching the effective magnitudes of rotational inertia associated with the transmission to the counter-rotating inertia associated with the engine reduces or eliminates any net torque reaction transferred to the stationary powertrain mounts or connections to surrounding structure, such as a vehicle chassis, due to vibrational changes in rotational speed (acceleration/deceleration) of the engine and transmission components. For internal combustion engine applications, each cylinder firing results in a small acceleration of the crankshaft as illustrated in FIGS. 4-5 with an associated torque reaction that would otherwise be transmitted to the powertrain mounts if not offset by a corresponding acceleration in the opposite-rotating inertia, and its associated torque reaction, according to the present disclosure.

Figure 8:
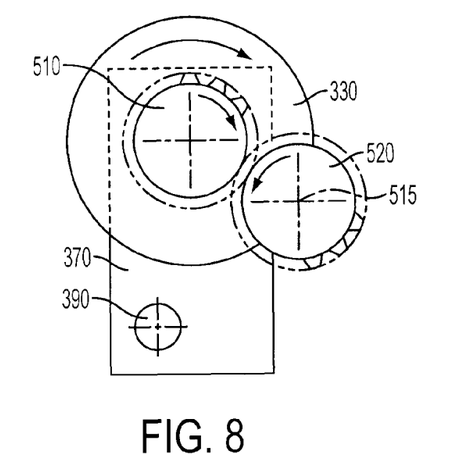
FIG. 8 is a side view block diagram of the system illustrated in FIG. 7.

FIG. 8 is a side-view schematic block diagram illustrating a transversely mounted powertrain for a FWD vehicle shown in the top view of FIG. 7. In this embodiment, toothed wheel 520 is mounted concentrically on crankshaft axis 515 with its teeth meshing with scissors gear 510 mounted concentrically on the central axis of torque converter 330. The toothed wheel 520 and scissors gear 510 are meshing in such a way that they always rotate in opposite directions relative to each other. As shown in FIG. 8, during operation, toothed wheel 520 mounted to the crankshaft rotates in a counter-clockwise direction about crankshaft axis 515 in the same direction as the crankshaft. Scissors gear 510 is disposed to rotate in a direction opposite to that of toothed wheel 520. As such, scissors gear 510 rotates in a clockwise direction as shown in FIG. 8. Because scissors gear 510 is mounted on torque converter 330, torque converter 330 also rotates in the same direction as scissors gear 510. Thus, the meshing engagement of toothed wheel 520 and scissors gear 510 allows torque converter 330 to rotate in a clockwise direction when the crankshaft rotates in a counter-clockwise direction. With this reversal of rotational direction through an essentially rigid or non-compliant coupling, the rotational accelerations of the inertia of torque converter 330 and associated transmission components act in an opposite direction to the rotational accelerations of the inertia of crankshaft 316 and associated engine components. The rotational acceleration of torque converter 330 acting in a direction opposite to that of crankshaft 316 will reduce or eliminate the resulting net torque reaction on stationary powertrain structure and hence improve performance with respect to noise, vibration, and harshness (NVH).

Figure 9:
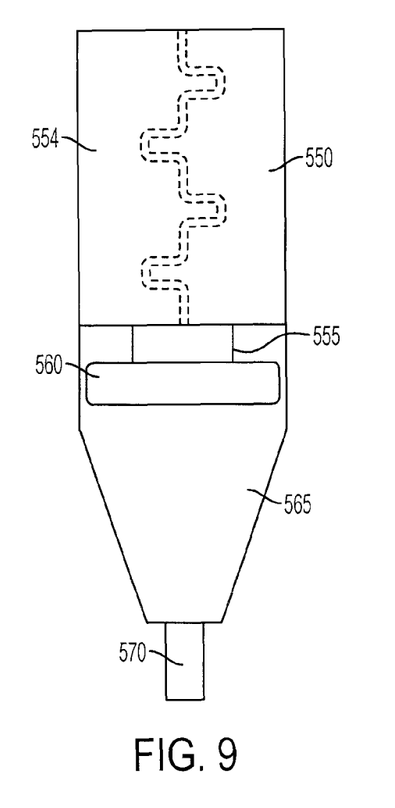
FIG. 9 is a top view block diagram illustrating a system or method for managing inertial torque reaction for a longitudinally mounted powertrain according to one embodiment of the present disclosure.

FIG. 9 is a top view schematic block diagram that illustrates another embodiment of the present disclosure for a longitudinally mounted powertrain, such as used in a typical rear wheel drive (RWD) vehicle, for example. In this embodiment, engine/motor 550 includes a crankshaft or output shaft coupled via device 555 to torque converter 560 of transmission 565 with output shaft 570 connected to a vehicle drive shaft (not shown) or other machinery depending upon the particular application. Torque from engine/motor 550 is carried by crankshaft 554 through coupling device 555 to torque converter 560. Coupling device 555 reverses the direction of rotation of torque converter 560 relative to crankshaft or engine/motor output shaft 554 so that one or more components of transmission 565, such as torque converter 560, provide a counter-rotating inertia to reduce or eliminate any net torque reaction associated with the rotating inertia of various components of engine/motor 550 on or through the stationary powertrain structure. Coupling device 555 may be implemented by any of a number of devices such as two or more meshing gears, a planetary gear set, or similar devices to reverse the direction of rotation with an integrated or separate device to provide an essentially non-compliant or close coupling to align the magnitude/phase of the reaction torque imposed by the counter-rotating components with the torque imposed on the crankshaft by the cylinder firings during operation in a reduced displacement mode. Coupling device 255 may include a scissors gear, for example, or another biasing device with an appropriate rotational biasing relative to forward and backward rotation to be compliant to low-frequency events such as thermal expansion and wear, but rigid or non-compliant to higher frequency events, such as the torque pulsations at the cylinder firing frequency. Rotation of torque converter 560 provides a selective fluid coupling and torque multiplication so that power from torque converter 560 is transmitted through transmission 565 to transmission output shaft 570.

In addition to reversing the direction of rotation of various transmission components relative to rotating engine components, coupling device 555 may also provide a selected or selectable speed differential between motor/engine output shaft/crankshaft 554 and a transmission input shaft or torque converter 560 to substantially match the effective magnitudes of rotational inertia of rotating drive line and engine components. For applications utilizing a device 555 having a selectable speed differential, a corresponding mechanical, electrical, or microprocessor based actuator/controller may be provided to select one of the available input/output ratios based on an operating mode or current operating conditions, for example. Depending on the component mass and geometry, coupling device 555 may increase or decrease the rotational speed of one or more drive train components relative to one or more engine components. In one embodiment, coupling device 555 reduces the rotational speed of torque converter 560 relative to crankshaft 554 to better match effective rotational inertia magnitudes. However, the actual input/output speed of coupling device 555 will depend upon various application and implementation specific parameters including engine and drive train component geometry, relative mass of components, and relative location of rotating components, for example.

Figure 10:
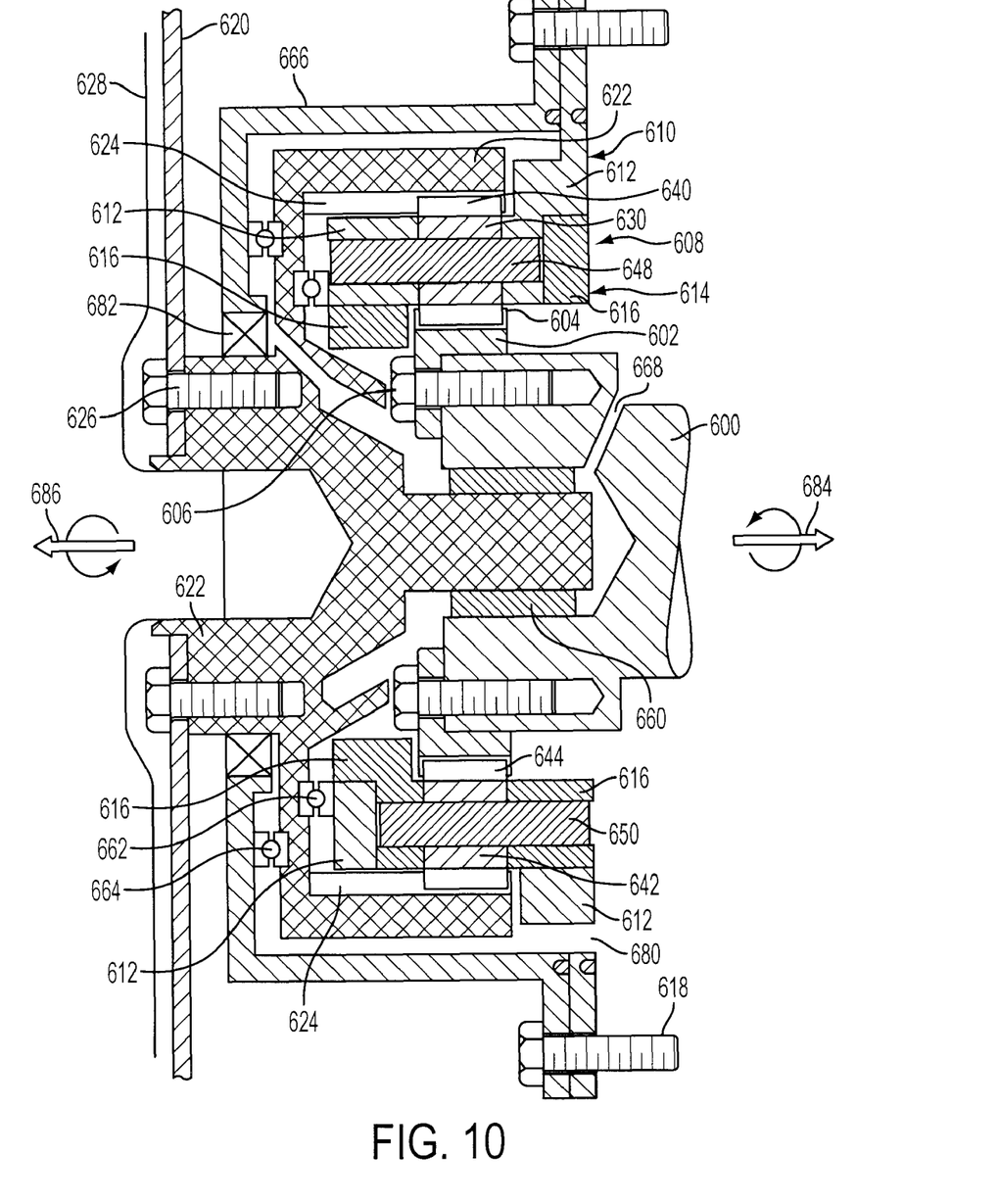
FIG. 10 is a cross-section of a device for coupling a drivetrain to an engine in a system or method for managing inertial torque reaction according to one embodiment of the present disclosure.

A cross-section of one embodiment of a device for coupling a prime mover to a drive train in a system or method for managing inertial torque reaction of a powertrain according to the present disclosure is shown in FIG. 10. In this embodiment, the coupling device comprises a planetary gear set to reverse rotational direction and provide a speed differential for a transmission/transaxle torque converter relative to an engine crankshaft. Appropriate construction of the planetary gear set provides a desired speed differential to substantially match effective magnitudes of rotational inertia of engine and drive train components as described herein.

Referring now to FIG. 10, a side cross-section view of a representative application for a two-part carrier planetary gear set for close coupling a drivetrain to an engine in a system or method for managing NVH while operating in a reduced displacement mode according to the present disclosure is shown. In this embodiment, the planetary gear set reverses rotational direction and provides a speed differential for a transmission/transaxle torque converter relative to an engine crankshaft while providing a non-compliant coupling at the cylinder firing frequency while operating in a reduced displacement mode. Engine output shaft or crankshaft 600 is fastened to sun gear 602, which acts as the input member, using one or more fasteners 606. A two-part planet carrier 608 includes a first part 610 and a second part 614. Stated differently, a planetary gear set according to the present invention includes a first planet carrier 610 and a second planet carrier 614. A plurality of fasteners 618 attaches first part 610 of planet carrier 608 to a fixed, non-rotating portion of an engine (not shown), such as the engine block, for example. Flex plate 620 is attached to ring gear 622 using a plurality of fasteners 626. Torque converter 628 is attached to flex plate 620 using a plurality of fasteners (not shown).

Each of a first set of planet pinion gears 630 includes at least one pinion or planet gear that rotates about an axle shaft 648 and is mounted on first part 610 of planet carrier 608 with gear teeth 640 constantly in mesh with gear teeth 624 of ring gear 622 and gear teeth 604 of sun gear 602. First part 610 of planet carrier 608 includes a rigid hoop structure 612 at each end of axle shaft 648 to ensure that gears 630 in the first set of planet pinions maintain proper alignment even when carrying a heavy load. Each of a second set of planet pinion gears 642, which includes one or more pinion or planet gears, rotates about an axle shaft 650 and is mounted on second part 614 of planet carrier 608 and has its gear teeth 644 constantly in mesh with gear teeth 624 of ring gear 622 and gear teeth 604 of sun gear 602. A corresponding rigid hoop structure 616 at each end of axle shaft 650 maintains proper alignment of the second set of pinions. As shown in FIG. 10, the axial (left-to-right in the Figure) orientation or positioning of axle shaft 648 is offset relative to axle shaft 650 to accommodate rigid hoop structures 612 and 616.

First set of planet pinion gears 630 and second set of planet pinion gears 642 have substantially identical gear tooth profiles. Needle bearings 660 support ring gear 622 inside an associated bore in crankshaft 600 such that relative rotational motion is permitted between ring gear 622 and crankshaft 600. Thrust bearings 662, 664 are parallel to each other and perpendicular to the crankshaft axis to restrict axial movement of ring gear 622 and prevent pitch and yaw. Thrust bearings 662, 664 react against stationary components 666, and 612 with one face of each thrust bearing piloted to ring gear 622 to maintain concentricity to the ring gear's axis of rotation and the opposite face of each thrust bearing being free to slide up/down or side-to-side on its mating flat stationary surface. Appropriate installation of these thrust bearings will prevent fore/aft vibration of ring gear 622 potentially caused by reversing thrust loads imposed upon it by the planet gears 630, 642. If necessary, a selectable thickness shim may be inserted during assembly to provide more precise control of axial clearance. Thrust bearings 662, 664, and needle bearings 660 are configured with axes aligned with the crankshaft axis to provide the desired freedom of rotation about that axis while preventing two or more bearings from controlling the same alignment feature, which could otherwise generate loads against one another.

Oil passage 668 supplies oil from the rear crankshaft main bearing of the engine to provide lubrication for the planetary gear set. Oil path 680 allows oil to drain out of the planetary gear set components and be returned to the oil sump of the engine (not shown). Various seals, such as oil seal 682 prevent loss of oil.

In operation, the planetary gear set illustrated in FIG. 10 operates to provide a non-compliant coupling at the engine firing frequency with an optional speed differential (depending on design) to better match inertia of forward rotating inertial components of the engine to the inertia of reverse rotating inertial components of the drivetrain to reduce or eliminate torsional vibration associated with cylinder firing frequency. A more detailed explanation of the operation of such a planetary gear set is provided in commonly owned U.S. Pat. No. 7,261,667 B2, the disclosure of which is incorporated by reference.

Figure 11:
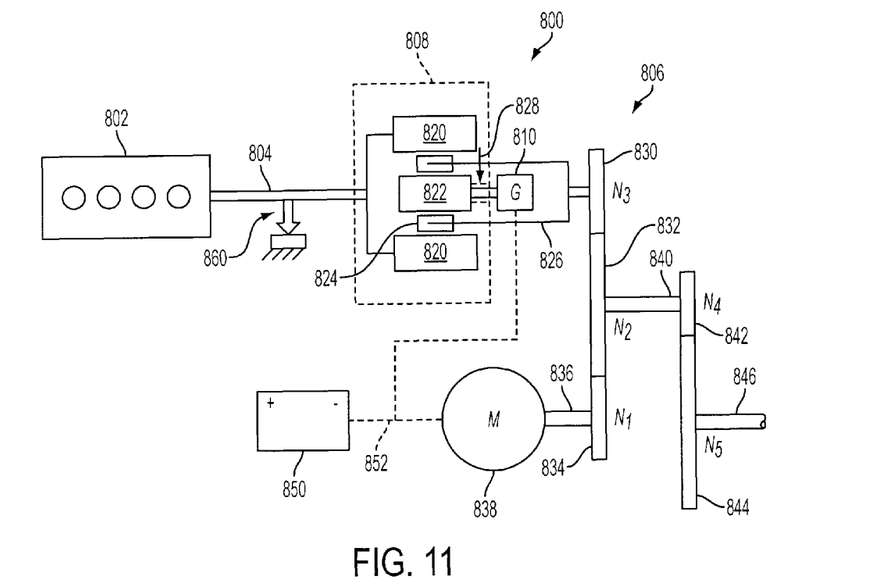
FIG. 11 is a block diagram illustrating a system or method for managing inertial torque reaction in a hybrid engine/motor powertrain according to one embodiment of the present disclosure.

A block diagram illustrating a system and method for managing inertial torque reaction according to one embodiment of the present disclosure in a hybrid powertrain is shown in FIG. 11. Hybrid powertrain 800 includes a multiple cylinder internal combustion engine 802 with an output shaft or crankshaft 804 coupled to a drive train 806. A one-way clutch 860 prevents crankshaft/output shaft 804 from reversing rotational direction. During selected operating modes of the hybrid system when engine 802 is operating to drive generator 810, device 808 reverses direction of rotation and provides a speed differential between output shaft 804 and generator 810, which is one of the more significant contributors to rotational inertia of drive train 806. As such, counter-rotation of generator 810 relative to crankshaft 804 reduces or eliminates any associated net torque reaction on stationary powertrain structure as described herein. In the representative embodiment illustrated in FIG. 11, device 808 is implemented by a planetary gear set with engine crankshaft 804 driving ring gear 820. Sun gear 822 is in constant meshing engagement with a plurality of planet gears 824 supported by carrier 826. Planet gears 824 are also in meshing engagement with ring gear 820.

Carrier 826 of device 808 is coupled via meshing engagement of gears 830, 832, and 834 to motor shaft 836 of electric motor 838. Gear 832 is coupled to intermediate shaft 840, which is in turn coupled to gear 842, which is in meshing engagement with output gear 844 coupled to output shaft 846. A battery 850 or other energy storage device is coupled via electrical connection 852 to motor 838 and generator 810.

According to the present disclosure, hybrid powertrain 800 includes one or more operating modes where one or more inertial components of engine 802 and powertrain 806 rotate in opposite directions to provide counter-rotating inertia to reduce or eliminate reaction torque associated with acceleration/deceleration of rotating components. When the vehicle speed is low, so that the rotational speed of planet carrier 826 is substantially less than that of crankshaft 804, sun gear 822 and generator 810 are forced to rotate in the direction opposite to that of the crankshaft. Depending upon the effective magnitude of rotational inertias of engine components and drive train components, the present disclosure may also provide a predetermined or selectable speed differential to substantially match effective magnitude of inertias as previously described.

Figure 12:
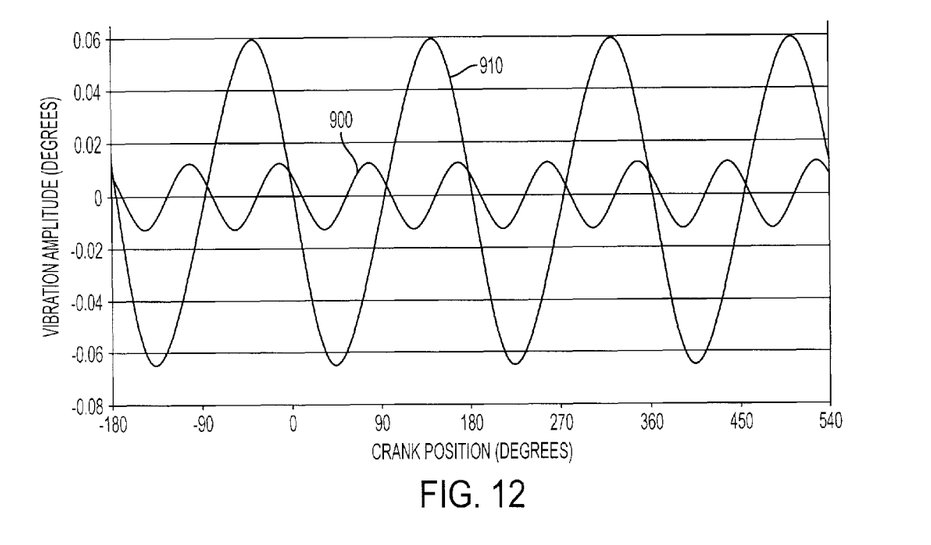
FIG. 12 is a graph illustrating vibrational amplitude for a representative eight-cylinder engine having a four-cylinder reduced displacement operating mode.

FIG. 12 is a graph illustrating vibrational amplitude as a function of crankshaft position for an eight-cylinder engine operating at 1500 rpm WOT in full displacement mode and reduced displacement mode. In full displacement mode with all eight cylinders firing, the crankshaft deviates from constant rpm rotation (vibrates) by ±0.01 degrees as represented by line 900. In the reduced displacement mode with four cylinders firing, the crankshaft vibrational magnitude is six times greater, or ±0.06 degrees as represented by line 910. As also illustrated in FIG. 12, the vibrational frequency is directly related to the cylinder firing frequency and is reduced by one-half when operating in the reduced displacement mode with one-half of the cylinders firing. Any device used to couple the forward rotating and backward rotating components to manage NVH associated with cylinder firing frequency in the reduced displacement mode should provide a non-compliant or tight coupling with minimal elasticity at the cylinder firing frequency to allow the counter-rotating inertia to reduce or cancel the effect of the cylinder firings. For example, if the coupling device includes two meshing gears with a 200 mm pitch diameter gear secured for rotation with the crankshaft, the torsional vibrations of the crankshaft operating in eight-cylinder or full displacement mode result in positional variation at the pitch circle of ±0.021 mm. When operating in the reduced displacement mode with four cylinders firing, the positional variation at the pitch circle of the coupling gear would be ±0.104 mm. For best response to the cylinder firing frequency in the reduced displacement operating mode, the gear set of the coupling should have no clearance or lash between mating teeth, since lash equal to or greater than the positional variation of the coupling gear would not transmit the torsional pulsations through the coupling to act against the counter-rotating inertia and the vibration would be transmitted through the stationary structure.

The gear set must, however, accommodate manufacturing tolerances as well as thermal expansion and wear. A representative calculation for thermal expansion assuming an aluminum housing and steel gears having a pressure angle of 12° mounted on shafts with 200 mm separation distance and an operating temperature range between −29° C. and 138° C. shows that the differential thermal growth between the shaft centerlines is about 0.43 mm. The corresponding separation between the gear teeth to accommodate the thermal expansion would be 0.092 mm, which is larger than the positional variation at the gear when operating in the reduced displacement mode. As such, the coupling device should be compliant to low frequency (or slow) events such as thermal expansion and wear while being essentially rigid or non-compliant relative to high frequency (or fast) events, such as the torque pulsations occurring at the cylinder firing frequency. A scissors gear having a spring or biasing element with an appropriate spring preload provides the necessary compliance or elasticity for slow, low frequency events while also acting as an essentially non-compliant or rigid coupling at the cylinder firing frequency.

While the best mode for carrying out the disclosure has been described in detail, those familiar with the art to which this disclosure relates will recognize various alternative designs and embodiments as defined by the following claims. One or more embodiments have been described as providing advantages or being preferred over other embodiments and/or over prior art in regard to one or more desired characteristics. However, as one skilled in the art is aware, compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:

1. A system for operating a multiple cylinder internal combustion engine, the system comprising:
    a first mode wherein a device for closely coupling the engine to a drive train such that the drive train components generate a rotational inertia reaction torque in a direction opposite rotational inertia reaction torque generated by the engine to reduce transmission of vibration associated with combusting air-fuel mixtures in all cylinders of the engine;
    a second mode wherein the device for closely coupling the engine to the drive train generates a rotational inertia reaction torque in a direction opposite rotational inertia reaction torque generated by the engine to reduce transmission of vibration associated with operating the engine in a reduced displacement mode; and
    a controller to alternate operation between the first mode and the second mode in response to operating conditions.

2. The system of claim 1 wherein the controller operates the engine in the second mode during engine idling.

3. The system of claim 1 wherein the controller operates the engine in the second mode while the drivetrain is in the lowest forward gear.

4. The system of claim 1 wherein the device comprises:
    a first gear secured for rotation with an output component of the engine; and
    a second gear in meshing engagement with the first gear and secured for rotation with an input component of the drive train such that the input component of the drive train rotates in an opposite direction relative to rotation of the output component of the prime mover, wherein at least one of the first and second gears is rotationally spring-biased relative to the other gear with a spring preload force that maintains contact between mating teeth of the first and second gears in response to crankshaft angular accelerations associated with cylinder firing frequency of the engine in the reduced displacement mode.

5. The system of claim 1 wherein the device comprises a planetary gear set having an input/output speed differential selected to better match forward rotating inertia and backward rotating inertia during operation in the second mode, the planetary gear set providing a non-compliant coupling with substantially zero backlash during operation while accommodating thermal expansion, wear, and manufacturing variation.

6. The system of claim 1 wherein the device creates a speed differential between rotational speed of an output component of the engine and an input component of the drive train.

7. The system of claim 1 wherein the engine includes a crankshaft, the drive train includes a transmission having a torque converter, and wherein the device comprises a gear set closely coupling the crankshaft to the torque converter.

8. The system of claim 1 wherein the engine includes a crankshaft, the drive train includes a transmission having a torque converter, and wherein the device reverses direction of rotation of the torque converter relative to direction of rotation of the crankshaft.

9. A system for reducing vibration associated with cylinder firing frequency when operating a multiple cylinder internal combustion engine in a reduced displacement mode with fewer than all cylinders combusting fuel, the system comprising:
    an engine controller in communication with the engine, the engine controller operating the engine in a first mode having a first cylinder firing frequency, and a second mode having a second cylinder firing frequency with at least one of the cylinders deactivated;
a transmission having an input component; and
a device for substantially non-compliantly coupling an output component of the engine to the input component of the transmission so that the input component rotates in a direction opposite to the output component of the engine and to reduce torsional vibration associated with the second cylinder firing frequency while operating in the reduced displacement mode.

10. The system of claim 9 wherein the engine controller operates the engine in the second mode with reduced displacement when the engine rotational speed is below about 1000 rpm.

11. A method for controlling a multi-cylinder internal combustion engine operable in at least one reduced displacement mode with fewer than all of the cylinders combusting fuel, the method comprising:
operating the engine with a first number of cylinders at a first cylinder firing frequency;
deactivating at least one cylinder to operate in a reduced displacement mode at a second cylinder firing frequency; and
rotating at least one closely-coupled drive train component in a direction opposite to rotating inertia created by operation of the engine to reduce torsional vibrations associated with the second cylinder firing frequency while operating in the reduced displacement mode.

12. The method of claim 11 wherein deactivating at least one cylinder comprises deactivating at least one cylinder while the engine rotational speed is below about 1000 rpm.

13. The method of claim 12 wherein deactivating at least one cylinder comprises initiating or continuing deactivation of at least one cylinder during an engine idle mode.

14. The method of claim 11 wherein deactivating at least one cylinder comprises continuing deactivation of at least one cylinder with an associated transmission operating in first or second gear.

15. The method of claim 11 wherein the engine includes a crankshaft and the drive train includes a transmission having at least one inertial component including one of a torque converter or a flywheel and wherein rotating at least one closely-coupled drive train component comprises rotating the at least one inertial component in a direction opposite to rotational direction of the crankshaft.

16. The method of claim 11 further comprising coupling the drive train to the engine using a device with no backlash to reverse direction of rotation of a drive train torque converter relative to an engine crankshaft.

17. The method of claim 16 wherein coupling the drive train to the engine comprises coupling the torque converter and the crankshaft using a planetary gear set.

18. The method of claim 16 wherein the step of coupling comprises connecting the torque converter to the crankshaft using a plurality of toothed wheels with at least one of the plurality of toothed wheels being a scissors gear.

19. The method of claim 11 further comprising operating the drive train to create a counter rotating inertia having a magnitude substantially equal to rotating inertia of the engine.

20. The method of claim 11 further comprising operating at least one counter rotating drive train component at a speed differential relative to engine speed, the speed differential being proportional to rotational inertia magnitude of the engine relative to rotational inertia magnitude of the drive train.

* * * * *